3,216,976
ANIONIC POLYMERIZATION OF HIGHER LACTAMS

Erich Schwartz, 23 Pfalzplatz, Mannheim, Germany, and Manfried Paul, deceased, late of 4 Mittaschplatz, Ludwigshafen, Rhine, Germany, by Ursula Paul, legal representative of estate of said Manfried Paul, deceased
No Drawing. Filed July 21, 1958, Ser. No. 72,260
Claims priority, application Germany, July 20, 1957,
B 45,396
9 Claims. (Cl. 260—78)

This invention relates to a process for the production of shaped articles from polyamides.

The production of large shaped articles from polyamides by the fusion casting method always offers considerable difficulty. In order to obtain the articles free from bubbles, the solidification process must be carried out in a regulated manner. By reason of the low thermal conductivity of the polyamides, the cooling often lasts several days. In spite of this the shaped articles thus prepared are often not free from stress even when the cooling is carried out carefully. Articles, prepared by machining semi-finished products, may therefore crack or distort. The slow cooling moreover results in the formation of a coarse crystalline structure which is very detrimental to the mechanical properties of the article.

These disadvantages are avoided by the present invention which relates to the production from polyamides of dimensionally stable shaped articles substantially free from stress.

A further object of the invention is the production of shaped articles from polyamides having a finely crystalline or amorphous structure and high mechanical strength. Finally it is an object of the invention to prepare shaped articles from polyamides containing large amounts of fillers.

The objects of the invention are achieved by reacting a lactam having at least seven ring members with an alkaline-reacting catalyst, carefully removing any water from the reaction mixture and, after the addition of an acid derivative as polymerization activator, initiating the polymerization at a temperature above the melting point of the monomeric lactam and carrying it out in a mold at a temperature at the most about 40° C. above the softening point of the polyamide.

By this process it is possible to polymerize polyamide-forming lactams with more than seven ring members, for example caprolactam, oenanthic lactam, caprylic lactam or lauric lactam or their C-substitution products such as for example 4-isopropylcaprolactam or 3-methylcaprolactam, and mixtures of different lactams.

As the alkaline polymerization catalysts there may be used alkali and alkaline earth metals, especially sodium and potassium, but also the oxides, hydroxides, hydrides, amides, salts of weak acids, for example carbonates, and other alkaline-reacting compounds of these metals. Moreover, the alkali and alkaline earth metal salts of lactams and also other strongly basic organo-metallic compounds, for example alcoholates, are suitable.

In each case it is necessary to prepare the active compound of the alkali or alkaline earth metal with the lactam; these compounds form readily from the metals, their oxides, hydroxides, hydrides or carbonates with the lactams at temperatures above the melting point of the lactams. Any water present or formed by the reaction must be carefully removed. This may be effected either by distilling it off in vacuo and/or by leading an inert gas through the lactam melt. The alkaline polymerization catalysts are used in amounts of 0.05 to 5% by weight, preferably 0.1 to 1% by weight with reference to the weight of the monomeric lactam. The molecular weight of the polyamide can be varied depending on the content of alkali compounds. When the proportion of alkali compounds is small, polyamides are formed with such a high molecular weight that they become insoluble and consequently their K-value can no longer be measured. As the content of alkali compounds increases, the molecular weight becomes less.

As polymerization activators there can be used the derivatives of acids. Particularly suitable are the derivatives of carboxylic acids, e.g. the halides, anhydrides, esters, and amides of carboxylic acids, or the nitriles derived from carboxylic acid. Such compounds are for example phthalic anhydride, succinic anhydride, or butyl stearate. The preferred activators are the halides of carboxylic acids such as actyl chloride, benzoyl bromide and terephthaloyl chloride. There also come into question derivatives of inorganic acids, e.g. esters such as triphenyl phosphate. The activators are suitably used in amounts of 0.01 to 5% by weight, preferably 0.05 to 1% by weight with reference to the weight of the monomeric lactam.

A possible embodiment of the process consists in reacting the monomeric lactam melt with a small amount of the alkaline catalyst and adding to the reaction mixture, after removal of water, such an amount of activator that the polymerization is initiated by contact with the heated walls of the mold when the melt is poured into the mold. Since the polymerization proceeds exothermically and substantially adiabatically, the reaction accelerates spontaneously and as a rule is complete within a few minutes.

The initiation of the polymerization by supply of heat need not necessarily take place at the hot walls of the mold; it is also possible to achieve a local heating of the lactam melt, at which the polymerization is initiated, during the pouring into the mold, with the aid of a heating aggregate.

Another embodiment provides for only a part of the lactam to be reacted with the alkaline-reacting catalyst, the acid derivative being dissolved in the second part. The two parts are directly united in the mold, the temperature of the two reaction mixtures being chosen so high that the polymerization is initiated after they have been united.

In all methods which are carried out with the dehydrated alkaline lactam melt, moisture is to be substantially excluded. Thus for example the pouring of the melt into the molds should take place as rapidly as possible in order to limit to a minimum any contact with atmospheric moisture.

The production of the shaped articles in accordance with this invention can be carried out in any type of container from which the polymerized article can be removed in the solid state with the dimensions corresponding to the cavity of the container. The polymerization can also be carried out with advantage on a support by which only 1 dimension of the article is defined.

The molds used for the production of the shaped articles may consist, besides the usual materials such as metal, glass or ceramic materials, of glass-fiber reinforced polyester resin.

The polymerization should proceed in the temperature range between the melting point of the monomeric lactam and a temperature of at the most about 40° C. above the melting point of the polyamide. The most suitable reaction temperature is accordingly dependent on the lactam used. In general however the starting temperature, by which we mean the temperature of the reactive lactam melt, should be chosen as low as possible so that on the one hand sufficient time remains for pouring the monomer melt into the mold and on the other hand the temperature of the reaction mass does not rise too high by the heat of polymerization. Since the heat evolved in the polymerization rises from caprolactam to caprylic lactam, whereas the melting point of the polyamides reaches a maximum with oenanthic lactam, the most suitable starting temperature when working with caprylic lactam is especially low, namely about 80° to 120° C., while in the case of caprolactam it is more advantageous to start at temperatures between 120° and 180° C. In the production of mixed polyamides a mean value of the heat evolved can be assumed, while the softening point of the mixed polyamides lies lower than that of the homopolymers concerned. The choice of a suitable starting temperature is of special importance because the properties of the polyamide shaped article are substantially dependent on the fact of whether and how far the softening temperature of the polyamide is exceeded during the polymerization. If the polymerization takes place at temperatures below the softening point of the polyamide, especially hard shaped articles with uniform finely crystalline structure are obtained. In other cases the shaped articles have an amorphous structure, are somewhat less hard but all the tougher for that and more resistant to impact than the crystallized shaped articles. Moreover the crystallization tendency of the polyamides can be diminished by polymerizing in the presence of a small amount of a substance having crosslinking action, for example a bifunctional lactam such as methylene-bis-caprolactam.

The process according to this invention is also especially suitable for the production of polyamide shaped articles which contain large amounts of fillers. Thus shaped articles can be prepared without difficulty which contain up to 4 parts by weight of iron powder for each part by weight of polyamide. Other metal powders suitable as fillers are for example aluminum or copper powder. Furthermore metal oxides, such as molybdenum oxide, titanium dioxide or silica gel, and also metal salts, finely divided plastics, dyestuffs, carbon black or graphite are suitable as pulverulent additives. It is also possible to incorporate into the lactam, prior to the polymerization, coarsely particled or pieced additives in the form of fibers, fabrics or macerate, for example glass fibers or glass fabrics or fibers, fabrics or macerate of polyamides. The production of shaped articles with a large content of filler is especially advantageous by the process according to this invention because the filler can be mixed with the thinly liquid lactam melt, whereupon the conversion into a solid article takes place within a few minutes at relatively low temperatures. The risk that specifically heavy fillers should settle or that temperature-sensitive fillers should be damaged is therefore small.

Finely powdered fillers are preferably stirred into the melt after the reaction of the lactam melt with the alkali catalyst and dehydration of the melt have taken place, and the filled mixture is then poured into the molds. In other cases, the filler may however be stirred in before or after the addition of the entire catalyst system. Fabric or fibrous fillers are preferably laid in the mold and the active melt poured over them. Shaped articles with coarse-grained or pieced fillers may advantageously be prepared by filling the mold with the filler and forcing the activated melt upwardly through the hollow spaces remaining between the filler. When the shaped articles are filled with pieced polyamides, an especially good union with the filler is achieved when the two polyamides mix well in the melt. The fillers should be dried well prior to mixing.

According to the invention there are obtained polyamides with especially valuable mechanical properties and very low water-soluble content. In the polymerization it is of advantage that the shaping should take place with the melt of the monomeric lactam, i.e., in the mobile state, so that the difficulties associated for example with injection molding large articles by reason of the viscosity of the polyamide and the risk of premature solidification of the melt when it is filled into the cold mold are avoided.

The polyamides prepared according to the said process have considerably higher molecular weights than those prepared by the usual methods so that in many cases they are insoluble even in concentrated acids and consequently are extremely resistant to mechanical, thermal and chemical stress. It is surprising that even large shaped articles of, for example, 20 centimeters diameter, shrink only very little, do not exhibit any bubble formation and no crack formation occurs. Depending on the reaction conditions they are amorphous or uniformly crystallized up to the edges with uniform fine-crystalline structure.

The monomer content is very small. It lies far below the value exhibited by polyamides which have been prepared by polycondensation reaction with the aid of water and which are in equilibrium with the monomeric lactams. For example in the case of polycaprolactam it amounts, depending on the polymerization temperature, to 1 to 5% as compared with 8 to 10% in the case of equilibrium condensates.

The process is especially well suited to the production of machine parts which are subjected to strong mechanical stress such as for example brasses, bushings, gear wheels, pulleys and the like. These articles may be prepared directly in the desired molds or may be cut from larger shaped articles.

The following examples will further illustrate this invention but the invention is not restricted to these examples. The parts specified in the examples are parts by weight.

*Example 1*

500 parts of epsilon-caprolactam and 2.25 parts of potassium hydroxide are allowed to react with each other at a pressure of 0.5 mm. Hg at about 90° C., the potassium hydroxide slowly passing into solution and the water formed being distilled off. Dry nitrogen is led through the melt. The temperature is slowly raised until at about 110° C. the lactam begins to boil. About 50 parts of lactam are distilled off. Then while stirring powerfully, 0.9 part of benzoyl chloride is added and the reaction mixture rapidly poured into a mold heated to 160° C. After 6 minutes the melt has solidified to a highly viscous mass which begins to crystallize after another 4 minutes. The polyamide formed has a K-value of 118 (measured in 90% formic acid). It contains 2.6% of extractable constituents. The melting point amounts to 220° C.

*Example 2*

5600 parts of epsilon-caprolactam and 27 parts of potassium hydroxide are reacted as in Example 1. After distilling off 200 parts of caprolactam, 16.2 parts of palmitic acid chloride are added at a temperature of 140° C. The mobile melt is rapidly poured into a circular mold heated to 180° C. After about 15 minutes the mass begins to solidify. After cooling, the polyamide has shrunk by about 2.5%. It is no longer soluble in concentrated sulfuric acid and 90% formic acid and melts at 222.5° C. It contains 1.3% of monomeric and 2.4% of oligomeric constituents.

*Example 3*

1000 parts of omega-caprylic lactam and 5 parts of potassium hydroxide are heated at 0.4 mm. Hg to 120° C. At this temperature, the potassium hydroxide dissolves in the caprylic lactam with a vigorous disengagement of water. The water distills off and also a small part of the caprylic lactam. After cooling to 80° C., 1 part of terephthaloyl chloride is added and the melt rapidly poured into a mold heated to 140° C. A polyamide is formed which is no longer soluble in concentrated sulfuric acid and 90% formic acid.

Example 4

90 parts of the reaction product of 1 mol of caprylic lactam and 0.25 mol of potassium hydroxide are added at 80° C. to 90 parts of freshly distilled caprylic lactam. Then 0.2 part of terephthaloyl chloride is added and the melt poured into a glass tube heated to 100° C. The mass gels after 2 minutes and begins to crystallize. The polyamide formed has a K-value of 120 and a melting point of 198° C.

Example 5

0.6 part of sodium is dissolved in 300 parts of dry fused caprylic lactam. After adding 0.9 part of benzoyl chloride, the melt is poured into a mold heated to 160° C. A polyamide having the K-value 95 is formed.

Example 6

200 parts of caprylic lactam is reacted with 2 parts of potassium hydroxide as in Example 3. Then, at about 80° C., 200 parts of dry fused caprylic lactam containing 0.8 part of terephthaloyl chloride dissolved therein are added. After pouring the mixture into a mold heated to 120° C., the melt becomes highly viscous in about 3 minutes and then solidifies to a polyamide which is insoluble in concentrated sulfuric acid and 90% formic acid.

Example 7

250 parts of caprylic lactam are brought to reaction with 1.25 parts of potassium hydroxide and dehydrated as described in Example 3. Similarly in a second batch 250 parts of caprolactam are reacted with 1.25 parts of potassium hydroxide as in Example 1. The two batches are united, 1 part of terephthaloyl chloride is added at about 80° C. and the whole poured into a mold which is at a temperature of 160° C. After a short time the polymerization reaction is initiated and there is formed an amorphous copolymer which is insoluble in concentrated sulfuric acid and 90% formic acid but is soluble in a mixture of methanol, benzene and water in the ratio 7:2:1. The melting point of the mixed polyamide amounts to 150° C.

Example 8

A mixture of 270 parts of caprylic lactam and 30 parts of caprolactam is brought to reaction with 1.5 parts of potassium hydroxide and dehydrated as in Example 3. The melt to which 1.5 parts of palmitic acid chloride have been added at 80° C. is further treated as in Example 7. The copolymer formed, of which the K-value amounts to 101, is crystallized and has a melting point of 200° C.

Example 9

10,500 parts of caprolactam and 100 parts of potassium hydroxide are brought to reaction as in Example 1 in a vessel of V2A-steel of 15 liters capacity. The water formed and 5% of the lactam are distilled off at about 0.5 mm. Hg while leading a current of dry nitrogen through. At the end of the reaction the temperature is 140° C. 40 parts of triphenyl phosphate are added to 10,000 parts of dry caprolactam at 140° C. in a second 15 liter vessel.

The two vessels have calibrated discharge pipes which open into a common tube.

One half of the batch is allowed to flow into a mold which has been preheated to 160° C. and in which the polymerization takes place as in Example 1. For the polymerization of the second half of the batch, the common tubular portion of the discharge pipes is preheated to 180° C. The monomeric melt is allowed to flow into a cold mold, whereby the polymerization is initiated in the hot tubular portion and proceeds in the mold with evolution of heat.

Example 10

1000 parts of epsilon-caprolactam and 4 parts of potassium hydroxide are heated to 160° C. and for 15 minutes a powerful current of oxygen-free nitrogen is led through the melt while maintaining the temperature. After this time, 1 part of terephthaloyl chloride is added and the whole poured immediately afterwards into a mold of which the walls are heated to 220° C. With a rise in temperature to 220° C. the polymerization is ended in a few minutes. After cooling, the shaped article, which softens at about 218° C. can be removed from the mold. The K-value of the polymer in 90% formic acid amounts to 120 and the content of monomeric constituents to 2%.

Example 11

1000 parts of anhydrous caprylic lactam are reacted with 3 parts of potassium methylate and the methanol formed removed at 120° C. by leading through a powerful current of oxygen-free nitrogen. The melt is then cooled to 90° C. and 2 parts of benzoyl chloride are stirred in. An iron rod heated to 220° C. is then dipped into the melt to initiate the polymerization. The reaction is ended after a few minutes with a rise in temperature to about 200° C. The shaped article softens at 195° C.

Example 12

550 parts of caprolactam and 500 parst of caprylic lactam are brought to reaction at 120° C. with 5 parts of potassium hydroxide. 50 parts of caprolactam and the water formed are distilled off at 0.5 mm. Hg. It is then heated to 150° C., 3 parts of benzoyl chloride are added while stirring and the melt is poured into a mold heated to 200° C. The polymerization is ended in a short time. An amorphous polyamide is formed of which the K-value is 109 (measured in 90% formic acid). It softens at about 160° C. and contains 2.1% of monomeric constituents.

Example 13

900 parts of caprolactam, 100 parts of caprylic lactam and 10 parts of methylene-bis-caprolactam are reacted with 5 parts of potassium hydroxide and dehydrated as in Example 12. The melt is heated to 160° C. and 1 part of terephthaloyl chloride is added. After pouring into a mold heated to 240° C. a soft tough polyamide is formed which shows only slight tendency to form crystalline regions.

Example 14

3.5 parts of powdered potassium hydroxide are added to 700 parts of caprylic lactam and the two brought to reaction with each other at about 120° C. The water formed is simultaneously removed by distillation at 0.5 mm. Hg. Then 300 parts of dry aluminum powder are stirred into the melt, the mixture cooled to 80° C. and 1.4 parts of benzoyl chloride added while stirring. The melt is poured into a cylindrical iron mold preheated to 160° C. in which it solidifies after 2 minutes and begins to crystallize after another 2 minutes. The polyamide shaped articles formed can be worked on a lathe.

Example 15

200 parts of caprylic lactam are reacted with 1 part of potassium hydroxide and dehydrated as in Example 1. The melt is cooled to 80° C., 0.6 part of benzoyl chloride is added and the whole poured into a mold preheated to about 80° C. Then 800 parts of a copper powder which has been dried at 100° C. in vacuo are stirred well with the lactam melt and finally an iron rod heated to 180° C. is dipped into the melt. After 1½ minutes the polymerization has been initiated from the hot iron rod and is ended in a few minutes. The homogeneous polyamide-copper block has good machinability.

*Example 16*

450 parts of caprolactam are reacted as in Example 1 with 2 parts of potassium hydroxide at 90° to 120° C. and dehydrated. Then 600 parts of iron powder are added and 50 parts of caprolactam distilled off at 0.5 mm. Hg. The mixture is heated up to 140° C. and 0.8 part of tetraphthaloyl chloride added. After pouring the mixture into a mold preheated to 180° C., it begins to polymerize after 15 minutes.

*Example 17*

A mixture of 200 parts of chemically pure glass fibers about 4 centimeters long and 850 parts of caprolactam is reacted with 4 parts of potassium hydroxide and the melt freed from the water formed and 50 parts of caprolactam by distillation at 110° C. and 1 mm. Hg. At 140° C., 2.4 parts of benzoyl chloride are added and the mixture poured into a mold heated to 180° C. After about 20 minutes, the melt has solidified to a hard block which contains about 3% of extractable constituents. The K-value of the polyamide is 105 and its melting point is 220° C.

*Example 18*

1500 parts of caprylic lactam are reacted as in Example 14 with 7.5 parts of potassium hydroxide and dehydrated. Then at 80° C., 3 parts of benzoyl chloride are added while stirring. The melt is poured over a glass fabric (from which the preparation has been removed by extraction with acetone) spread out on a sheet of metal and forced into the fabric by a short rolling with a metal roller heated to 100° C. By heating the sheet metal to about 180° C., the polymerization is initiated and there is formed a hard plate which can be machined.

*Example 19*

As in Example 1, 500 parts of caprylic lactam are reacted with 2.5 parts of potassium hydroxide and dehydrated. Into the melt at 80° C. there are stirred 300 parts of graphite. Then 1.5 parts of benzoyl chloride are dripped in while stirring and the mixture poured into a mold heated to 180° C. After about 90 seconds, the mass has solidified to a solid, machinable block.

*Example 20*

1000 parts of caprylic lactam, to which 500 parts of monomer-free polycaprolactam of the K-value 70 (measured in concentrated sulfuric acid) have been added, are allowed to react at 120° C. with 5 parts of potassium hydroxide. The water formed is removed at 0.5 mm. Hg. Then the melt is allowed to cool to 80° C., 2 parts of benzoyl chloride are added while stirring and the mixture is poured into a mold of glass-fiber reinforced polyester resin heated to 180° C. The melt has polymerized after 5 minutes. The polyamide formed has a K-value of 110 (measured in 90% formic acid) and contains 1.8% of extractable constituents. It lends itself to machining.

*Example 21*

A cylindrical iron tube, having a pipe at its lower end, is filled with dry monomer-free cuttings of polycaprolactam (K-value 70). The tube and cuttings are heated to 180° C. Then a melt of caprolactam at a temperature of 140° C., which has been treated as in Example 15 with potassium hydroxide and benzoyl chloride, is forced upwardly through the cuttings with the aid of oxygen-free nitrogen. After a short time the polymerization initiates and a solid block is formed which lends itself to machining.

We claim:

1. A process for the production of molded polyamide articles which comprises reacting a lactam having 7–13 ring members, which ring members consist of carbon and nitrogen atoms, with an alkaline-reacting catalyst selected from the group consisting of potassium metal, sodium metal and the oxides, hydroxides, carbonates and methylates of said metals in a proportion of 0.05 to 5% by weight of said catalyst with reference to said lactam at a temperature above the melting point of said lactam, removing essentially all of the water from the molten reaction mixture, combining under essentially anhydrous conditions the molten reaction product of said lactam and said catalyst with an acid activator from the group consisting of benzoyl chloride, benzoyl bromide, terephthaloyl chloride, an alkanoyl chloride, phthalic anhydride, succinic anhydride, butyl stearate and triphenyl phosphate in a proportion of 0.01 to 5% by weight of said lactam, immediately shaping the resultant molten composition in a mold having the shape of the article to be produced, providing a temperature of said resultant composition in the range of 80–180° C. to initiate in said mold in situ, rapid, exothermic polymerization of said lactam in the presence of said acid activator, opening the mold upon solidification of the resultant polymerized mass within a short period of not more than about fifteen minutes, and removing the solidified, molded polyamide article substantially free from stress from said mold.

2. The process of claim 1 wherein methylene-bis-lactam is combined in said mold with said reaction product and said acid activator.

3. The process of claim 1 wherein filler is added to the mixture in an amount up to 4 parts by weight of filler for each part by weight of the said lactam.

4. A process for the production of molded polycaprolactam articles which comprises reacting caprolactam with potassium hydroxide in a proportion of 0.05 to 5% by weight of potassium hydroxide with reference to the caprolactam at a temperature above the melting point of the caprolactam, removing essentially all of the water from the molten reaction mixture, combining under essentially anhydrous conditions the molten reaction product of the caprolactam and potassium hydroxide with benzoyl chloride in a proportion of 0.01 to 5% by weight of said caprolactam, immediately shaping the resultant molten composition in a mold having the shape of the article to be produced, providing a temperature of said resultant composition in the range of 120–180° C. to initiate in said mold in situ, rapid, exothermic polymerization of the caprolactam in the presence of said benzoyl chloride, opening the mold upon solidification of the resultant polymerized mass within a short period of not more than about fifteen minutes, and removing the solidified, molded polyamide article substantially free from stress from said mold.

5. A process for the production of molded polycaprylic lactam articles which comprises reacting caprylic lactam with potassium hydroxide in a proportion of 0.05 to 5% by weight of potassium hydroxide with reference to the caprylic lactam at a temperature above the melting point of the caprylic lactam, removing essentially all of the water from the molten reaction mixture, combining under essentially anhydrous conditions the molten reaction product of the caprylic lactam and potassium hydroxide with benzoyl chloride in a proportion of 0.01 to 5% by weight of said caprylic lactam, immediately shaping the resultant molten composition in a mold having the shape of the article to be produced, providing a temperature of said resultant composition in the range of 80–120° C. to initiate in said mold in situ, rapid, exothermic polymerization of the caprylic lactam in the presence of said benzoyl chloride, opening the mold upon solidification of the resultant polymerized mass within a short period of not more than about fifteen minutes, and removing the solidified, molded polyamide article substantially free from stress from said mold.

6. The process of claim 4 wherein the polymerization in said mold is conducted at a temperature not greater than 40° C. above the softening point of the polycaprolactam produced.

7. The process of claim 5 wherein the polymerization in said mold is conducted at a temperature not greater than 40° C. above the softening point of the polycaprylic lactam produced.

8. The process of claim 4 wherein the polymerization in said mold is conducted in a temperature range above the melting point of the caprolactam and below the softening point of the polyamide produced.

9. The process of claim 5 wherein the polymerization in said mold is conducted in a temperature range above the melting point of the caprylic lactam and below the softening point of the polyamide produced.

References Cited by the Examiner

UNITED STATES PATENTS

| | | | |
|---|---|---|---|
| 2,241,321 | 5/41 | Schlack | 260—78 |
| 2,647,105 | 7/53 | Mighton | 260—78 |
| 2,739,959 | 3/56 | Ney et al. | 260—78 |
| 3,017,391 | 1/62 | Mottus et al. | 260—78 |
| 3,017,392 | 1/62 | Butler et al. | 260—78 |
| 3,037,001 | 5/62 | Becke et al. | 260—78 |

FOREIGN PATENTS

| | | |
|---|---|---|
| 518,697 | 4/53 | Belgium. |
| 535,421 | 4/41 | Great Britain. |

OTHER REFERENCES

Sebenda et al.: Chem. listy (Czech), 52, pp. 758–759, 1958.

WILLIAM H. SHORT, *Primary Examiner.*

MILTON STERMAN, H. N. BURSTEIN, LEON J. BERCOVITZ, *Examiners.*